Aug. 24, 1926.

H. WEICHSEL 1,596,910

ALTERNATING CURRENT MOTOR

Filed Oct. 20, 1924

INVENTOR
Hans Weichsel
BY E. E. Huffman
ATTORNEY

Patented Aug. 24, 1926.

1,596,910

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed October 20, 1924. Serial No. 744,553.

My invention relates to synchronous and asynchronous motors employing a commutator and is particularly applicable to large slow speed machines. Among the objects of the invention are to avoid the use of a large commutator, or a large number of brushes in such machines, and also to provide means whereby the exciting magnetization may be caused to vary in the desired manner with increasing load.

Figure 1:
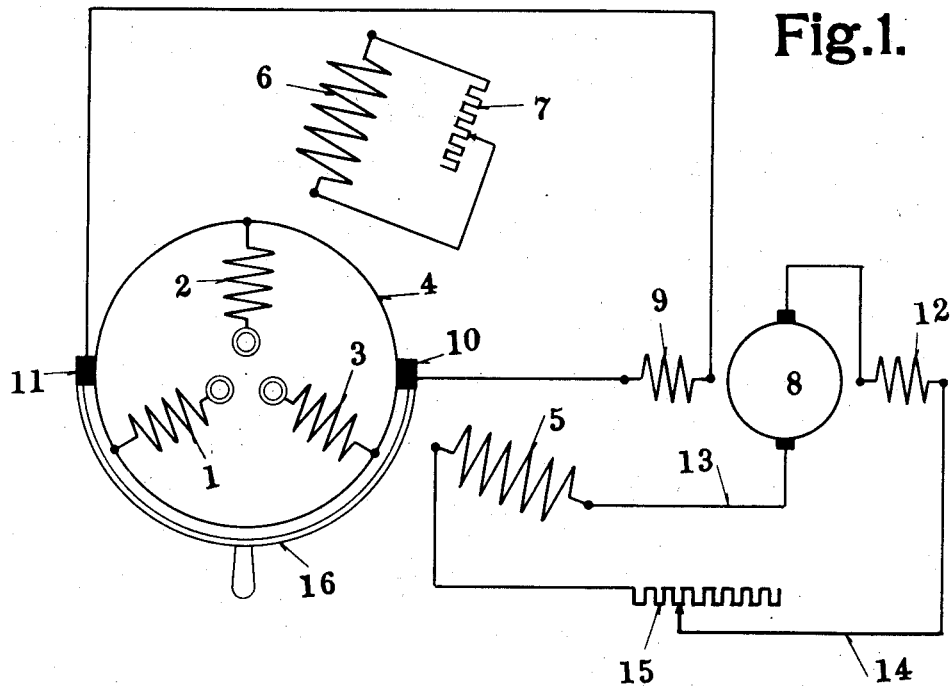
Figure 2:
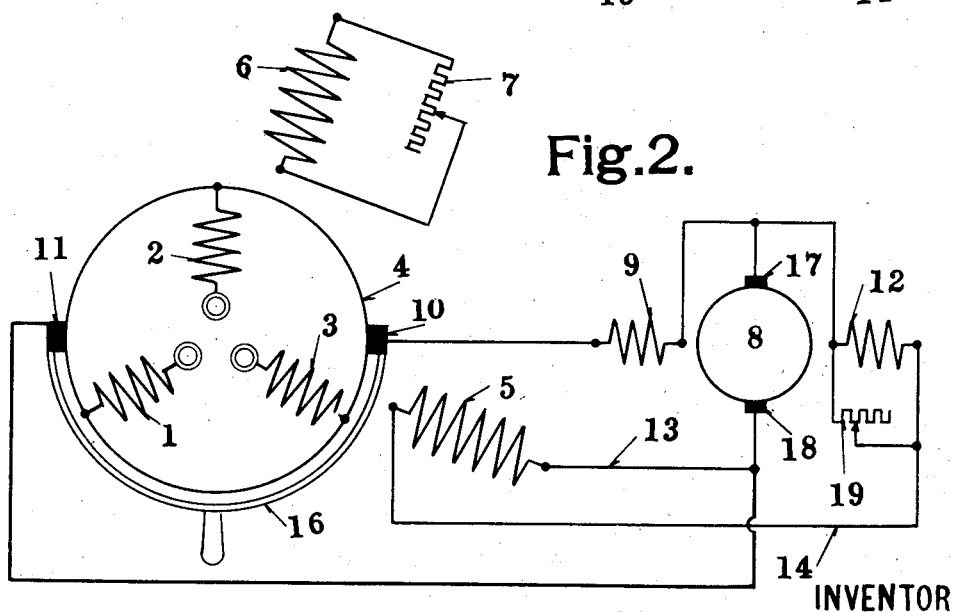

My invention is applicable to both single and polyphase motors and in the accompanying drawings Figure 1 illustrates a polyphase synchronous motor and associated means embodying my invention; and Figure 2 shows a modification of the exciter circuits shown in Figure 1.

The inducing member, which in the form shown is the rotor, is provided with polyphase windings 1, 2 and 3 supplied with line current through slip rings as indicated, and with a commuted winding 4 which may be interconnected with the polyphase winding as shown.

The stator is provided with winding 5 adapted to produce the unidirectional excitation of the machine in normal operation, and with a second winding 6 displaced preferably 90 degrees from the winding 4 and adapted to be either short-circuited or closed on itself by means of the adjustable resistance 7. This winding 6 acts as a polyphase secondary winding during the starting period and at speeds different from synchronism. 8 is an exciting generator which may be driven from the shaft of the main machine, or separately driven as desired. This generator is provided with an exciting winding 9 in circuit with the brushes 10 and 11 of the motor, and with a series exciting winding 12. The current generated by the exciter 8 is supplied to the exciting winding 5 through conductors 13 and 14 and adjustable resistance 15. Brushes 10 and 11 are mounted on rocker arm 16 whereby they may be shifted for the purpose hereinafter set forth.

Instead of the particular means of compounding the fields of the exciter 8, shown in Figure 1, I may arrange the circuits as shown in Figure 2 in which the exciting windings 9 and 12 are both in series with the brushes of the exciter. This last mentioned arrangement results in a higher exciting current through 5 with a particular value of voltage across the brushes 10 and 11 and thus the overload capacity of the machine may be increased to its maximum value in cases where, due to variations of actual from calculated values the connections of Figure 1 do not result in the desired maximum overload capacity.

Referring to the operation of the machine, at starting resistances 7 and 15 are adjusted to a suitable value and line current is supplied to the slip rings. Windings 5 and 6 then act as polyphase secondary windings and the machine starts with good torque. As the speed increases the frequency of the E. M. F. appearing at the brushes 10 and 11 decreases and becomes a direct current E. M. F. at synchronism. As the speed approaches synchronism the induction motor torque of course diminishes but the winding 5, which is displaced from the axis of the brushes 10 and 11, preferably by only a small angle, is supplied with exciting current from the exciter 11 and produces a strong synchronizing torque. Of course the strongest pull-in torque will be produced if the winding 5 is located in the axis of the brushes provided the self-induction in the circuit 9, 10, 11 is low in comparison with the resistance in the circuit because with relatively large resistance in this circuit the current will be nearly in phase with the voltage generated across the brushes 10—11 and the voltage induced in winding 5. If, however, the constants of the circuit 9, 10, 11 are such that during the synchronizing period the current therein is appreciably out of phase with the voltage generated across the brushes 10—11 and thereby also out of phase with the voltage induced in winding 5, then the synchronizing torque will be relatively small. To obtain the best phase relations during different portions of the starting period it is desirable to shift the brushes 10—11 with respect to the axis of the field winding 5, and this may be done by means of rocker-arm 16. When synchronous speed has been approximately attained the resistance 7 may be cut out and the resistance 15 adjusted to the desired operating value. Should the machine be pulled out of synchronism it will continue to operate as an induction motor, windings 5 and 6 again acting as polyphase secondary windings.

Figure 2 shows a special connection of the exciter windings. The purpose of this connection is to produce a voltage across conductors 14—13 which changes faster in its magnitude than the voltage generated across the brushes 10—11 of the main machine. This result is accomplished in the following manner:

The field winding 9 is connected to brushes 17 and 18 in such manner that a current flowing in circuit 10, 9, 17, 18, 11 will produce a voltage which is in series with the impressed voltage derived from the brushes 10—11 and thereby increases the current flow in the field winding 9. Consequently the voltage across 17—18 increases still further and the current suplied to winding 5 through conductors 14—13 increases rapidly with a relatively small change in the voltage generated across 10—11.

If, for any reason, it should be desired to have the currents in the winding 5" of lower value for a given voltage across the brushes 10—11 than in Figure 1, the connection between brushes 17—18 (Figure 2) and the exciting winding 9 must be reversed, and the magnetization of the series winding 12 may be reversed or decreased by means of resistance 19.

Having fully described my invention, what I claim as new and desire to secure by Letters Patent of the United States is:

1. In an alternating current motor, the combination of an inducing member having a commutator and brushes thereon, an induced member provided with a winding for producing exciting magnetization for the motor, a generator for supplying current to the exciting winding and having a field winding in circuit with the brushes on the inducing member.

2. In an alternating current motor, the combination of an inducing member having a commutator and brushes thereon, an induced member provided with an exciting winding, a generator for supplying current to the exciting winding and having a field winding in circuit with the brushes on the inducing member, and means for adjusting the position of said brushes.

3. In an alternating current motor, the combination of an inducing member having a commutator and brushes thereon, an induced member provided with an exciting winding, a generator for supplying current to the exciting winding and having a series field winding in circuit with the brushes on the inducing member.

4. In an alternating current motor, the combination of an inducing member having a commutator and brushes theron, an induced member provided with an exciting winding, a generator for supplying current to the exciting winding and having a field winding in circuit with the brushes on the inducing member, said generator also having a series field winding in circuit with the exciting winding.

5. In an alternating current motor, the combination of an inducing member having a commutator and brushes thereon, an induced member provided with an exciting winding, a generator for supplying current to the exciting winding and having a series field winding in circuit with the brushes on the inducing member, said generator also having a second series field winding in circuit with the exciting winding.

In testimony whereof, I have hereunto set my hand this the 14th day of October, 1924.

HANS WEICHSEL.